US012470450B2

United States Patent
Zhang et al.

(10) Patent No.: US 12,470,450 B2
(45) Date of Patent: Nov. 11, 2025

(54) METHOD OF LARGE FREQUENCY OFFSET ESTIMATION FOR AN OFDM COMMUNICATIONS SYSTEM USING REFERENCE SIGNALS

(71) Applicant: Hong Kong Applied Science And Technology Research Institute Co., Ltd., Shatin (HK)

(72) Inventors: Zhonghui Zhang, Shatin (HK); Yuxian Zhang, Tai Po (HK); Yibing Yao, Shatin (HK)

(73) Assignee: Hong Kong Applied Science And Technology Research Institute Co., Ltd., Shatin (HK)

( * ) Notice: Subject to any disclaimer, the term of this patent is extended or adjusted under 35 U.S.C. 154(b) by 405 days.

(21) Appl. No.: 18/102,323

(22) Filed: Jan. 27, 2023

(65) Prior Publication Data

US 2024/0259248 A1 Aug. 1, 2024

(51) Int. Cl.
*H04L 27/26* (2006.01)
*H04L 25/02* (2006.01)
*H04L 27/00* (2006.01)

(52) U.S. Cl.
CPC ...... *H04L 27/2666* (2013.01); *H04L 25/0224* (2013.01); *H04L 27/0014* (2013.01); *H04L 27/2675* (2013.01); *H04L 2027/0026* (2013.01)

(58) Field of Classification Search
CPC ......... H04L 2027/0026; H04L 25/0224; H04L 27/0014; H04L 27/2657; H04L 27/266;

(Continued)

(56) References Cited

U.S. PATENT DOCUMENTS

| 8,416,759 | B1 * | 4/2013 | Narasimhan | ...... H04W 56/0035 370/344 |
| 10,630,445 | B2 | 4/2020 | Vos et al. | |

(Continued)

FOREIGN PATENT DOCUMENTS

| CN | 103269322 A | 8/2013 |
| CN | 109561495 A | 4/2019 |

(Continued)

OTHER PUBLICATIONS

International Search Report (ISR) for PCT/CN2023/074221, mailed Aug. 23, 2023 (Year: 2023).*

(Continued)

*Primary Examiner* — Benjamin H Elliott, IV
(74) *Attorney, Agent, or Firm* — GableGotwals

(57) ABSTRACT

Described is a method of performing carrier frequency offset (CFO) estimation of physical channels in a mobile communications system. The method comprises the step of performing channel estimation of a received signal on a physical channel based on multiple orthogonal frequency division multiplex (OFDM) symbols in one or more reference signals (RSs). The method includes determining multiple phase rotation values $\Phi$ and corresponding time differences s between different OFDM symbols in the one or more RSs over a base phase rotation range comprising +/−π to obtain a first CFO estimation candidate $f_0$. The base phase rotation range is extended to provide an extended phase rotation range of greater than +/−π to obtain additional CFO estimation candidates $f_1, f_2 \ldots f_n$ within the extended phase rotation range.

19 Claims, 8 Drawing Sheets

(58) Field of Classification Search
CPC ............ H04L 27/2666; H04L 27/2675; H04L 27/2695
See application file for complete search history.

(56) References Cited

U.S. PATENT DOCUMENTS

| | | | |
|---|---|---|---|
| 11,206,167 B1* | 12/2021 | Zhang | H04L 27/2657 |
| 2009/0067517 A1* | 3/2009 | Hung | H04L 27/2659 375/341 |
| 2011/0255394 A1* | 10/2011 | Zha | H04L 27/0014 375/260 |
| 2017/0288932 A1* | 10/2017 | Kang | H04L 27/2698 |
| 2019/0222447 A1* | 7/2019 | Vos | H04L 27/2636 |
| 2021/0176109 A1* | 6/2021 | Pal | H04L 27/2659 |
| 2022/0116166 A1* | 4/2022 | Hui | H04L 27/2613 |
| 2024/0259248 A1* | 8/2024 | Zhang | H04L 27/2657 |

FOREIGN PATENT DOCUMENTS

| | | |
|---|---|---|
| CN | 111464471 A | 7/2020 |
| CN | 112398764 A | 2/2021 |
| CN | 114760173 A | 7/2022 |
| WO | 2016122156 A1 | 8/2016 |

OTHER PUBLICATIONS

Written Opinion of PCT/CN2023/074221, mailed Aug. 23, 2023 (Year: 2023).*

* cited by examiner

METHOD OF LARGE FREQUENCY OFFSET ESTIMATION FOR AN OFDM COMMUNICATIONS SYSTEM USING REFERENCE SIGNALS

FIELD OF THE INVENTION

The invention relates to a method of large frequency offset estimation for a mobile wireless communication system using reference signals (RSS) and especially for an orthogonal frequency division multiplex (OFDM) communications system such as, but not limited to, a fifth generation (5G) New Radio (NR) communications system.

BACKGROUND OF THE INVENTION

In a 5G NR communications system, the high carrier frequency orthogonal frequency division multiplex (OFDM) system is sensitive to frequency errors caused by: (i) high doppler shifts in the communication system such as may be encountered in high-speed environments such as a high-speed train or a vehicle to everything (V2X) sidelink communication system, for example; and/or (ii) a frequency mismatch between the local oscillators of the communication equipment's transmitter and receiver. This frequency mismatch is labelled as Carrier Frequency Offset (CFO). Since demodulation highly depends on signal phase information, phase rotation of signals caused by CFO reduces the accuracy of demodulation. The CFO also induces inter-carrier interference (ICI) and degrades the OFDM system. For a better performance of OFDM systems, the CFOs should be accurately estimated and compensated for. However, the CFO estimation range is restricted by the RS structure in the NR communication system, e.g., the separation of RSs in the time domain.

In a 5G NR communication system, the four main RSs are the Demodulation Reference Signal (DMRS), the Phase-Tracking RS (PTRS), the Sounding RS (SRS) and Channel State Information RS (CSI-RS) among other RSs.

CN11146447A1 discloses a frequency offset calculation method of an NR Physical Uplink Shared Channel (PUSCH). The frequency offset calculation method comprises a first step of receiving multiple segments of reference signals, and respectively sampling the received multiple segments of reference signals. The method includes, according to the distribution condition of the sampled multi-segment reference signals in the corresponding time domain, calculating the phase difference among the multi-segment reference signals so as to obtain a plurality of phase difference values. The method further includes, according to the obtained phase difference values, processing the signals in the corresponding frequency domains to obtain a first frequency offset group, wherein the first frequency offset group comprises a plurality of frequency offset values. Then, processing the first frequency offset group through a preset first value rule algorithm to obtain a first frequency offset value. This method poses a number of disadvantages. For example, the method cannot distinguish whether the phase difference is out of range which limits the measurement range. The method also requires the computation and combination of first and second group frequency offsets which is computationally complex. The method is only applicable to NR PUSCH.

CN112398764B discloses a demodulation reference signal (DMRS) and phase-tracking reference signal (PTRS) combined frequency offset estimation method. The method comprises carrying out channel estimation on a resource unit bearing a PTRS and a DMRS corresponding to a subcarrier where the PTRS is located to obtain a channel estimation value of each reference signal. The method includes calculating a correlation value between adjacent reference signal symbols according to the channel estimation value of each reference signa then obtaining a distance between adjacent reference signal symbols, wherein the distance between the adjacent reference signal symbols is the number of OFDM symbols spaced between the adjacent reference signal symbols. The method estimates the frequency offset according to the correlation value between all the adjacent reference signal symbols and the distance between the adjacent reference signal symbols to obtain a frequency offset estimation result. This method poses a number of disadvantages. For example, the method is only applicable to DMRS and PTRS which renders the method difficult to utilize in other channels. Not all DMRS subcarriers are used, only those on PTRS subcarriers are used so the signal to noise ratio (SNR) is lower than when using all DMRS subcarriers. Furthermore, noise on the channel response estimation will be severe due to lack of a noise suppression method. The method cannot distinguish whether the phase difference is out of range which limits the measurement range.

What is desired is a method to provide more accurate CFO estimation values for mobile communications system radio equipment, especially 5G NR radio equipment.

OBJECTS OF THE INVENTION

An object of the invention is to mitigate or obviate to some degree one or more problems associated with known methods of CFO estimation in 5G NR communication system.

The above object is met by the combination of features of the main claims: the sub-claims disclose further advantageous embodiments of the invention.

Another object of the invention is to provide more accurate CFO estimation values for mobile communications system radio equipment, especially 5G NR radio equipment.

One skilled in the art will derive from the following description other objects of the invention. Therefore, the foregoing statements of object are not exhaustive and serve merely to illustrate some of the many objects of the present invention.

SUMMARY OF THE INVENTION

In a first main aspect, the invention provides a method of performing carrier frequency offset (CFO) estimation of physical channels in a mobile communications system. The method comprises the step of performing channel estimation of a received signal on a physical channel based on multiple orthogonal frequency division multiplex (OFDM) symbols in one or more reference signals (RSs). The method includes determining multiple phase rotation values $\Phi$ and corresponding time differences s between different OFDM symbols in the one or more RSs over a base phase rotation range comprising $+/-\pi$ to obtain a first CFO estimation candidate $f_0$. The base phase rotation range is extended to provide an extended phase rotation range of greater than $+/-\pi$ to obtain additional CFO estimation candidates $f_1, f_2 \ldots f_n$ within the extended phase rotation range.

Preferably, the additional CFO estimation candidates $f_1, f_2, \ldots f_n$ within the extended phase rotation range are determined, selected, or calculated based on correlation results between the received RS after CFO compensation and the ideal RS.

Preferably, the CFO estimation candidates are obtained from the slope of a univariate linear regression function which describes the relationship of phase rotations and time differences between different OFDM signals.

In a second main aspect, the invention provides a method of performing carrier frequency offset (CFO) estimation of physical channels in a mobile communications system where the method comprises performing channel estimation of a received signal on a physical channel based on multiple orthogonal frequency division multiplex (OFDM) symbols in one or more reference signals (RSs) and determining phase rotations Φ and corresponding time differences s between different OFDM symbols in the one or more RSs over an extended phase rotation range greater than +/−π to obtain multiple CFO estimation candidates $f_0, f_1, f_2 \ldots f_n$ within the extended phase rotation range.

In a third main aspect, the invention provides a radio equipment in a mobile communications system, the radio equipment comprising a memory storing machine-readable instructions and a processor for executing the machine-readable instructions, such that, when the processor executes the machine-readable instructions, it configures the radio equipment to implement the method of the first main aspect of the invention or the second main aspect of the invention.

In a fourth main aspect, the invention provides a non-transitory computer-readable medium storing machine-readable instructions, wherein, when the machine-readable instructions are executed by a processor, they configure the processor to implement the method of the first main aspect of the invention or the second main aspect of the invention.

The summary of the invention does not necessarily disclose all the features essential for defining the invention: the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
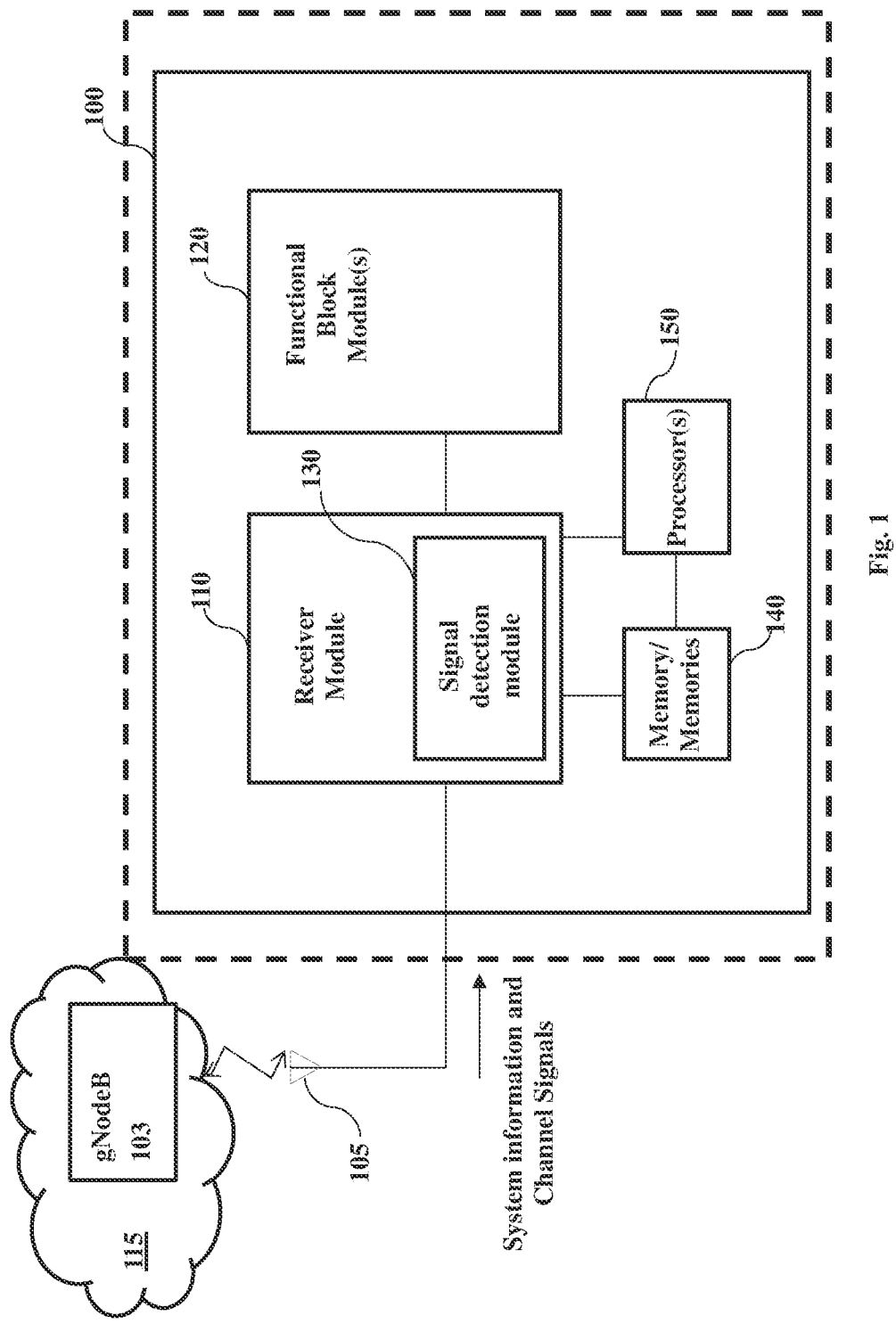
FIG. 1 is a block schematic diagram of an improved radio equipment device or network node in accordance with the invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS. may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

References to 5G radio equipment in the following description do not exclude the application of the methods described herein to radio equipment of compatible mobile communications systems.

5G NR is the new mobile communication standard presented by the 3rd generation partnership project (3GPP) and presents a major improvement over the 4G LTE-advance (LTE-A) standard, where the main focus is on enhanced mobile broadband, ultra-reliable and low latency communications, and massive machine-type communications. To achieve these goals, 3GPP has introduced a unified network architecture, with a new physical layer design that supports very high carrier frequencies, large frequency bandwidths, and new techniques such as massive multiple-input and multiple-output (MIMO), and beamforming. Those major modifications increase the synchronization procedure challenges. In fact, the very high defined carrier frequencies result in large values of CFOs, which typically need an accurate and expensive oscillator to align a transmitter and a radio equipment for interference-free communications. The sources of interference are mainly related to the imperfections of OFDM systems, which suffer from the CFOs that result in inter-carrier interference (ICI) and inter-symbol interference (ISI). Errors in the transmitter and the radio equipment oscillators can result in CFO, which is a linear phase over the time domain samples and it causes ICI over the subcarriers. The impact of CFO increases in time as it is directly proportional to the discrete time index. The CFO in OFDM is usually normalized to the sub-carrier spacing as the ratio between the frequency error and the sub-carrier spacing.

In addition, the 3GPP has introduced a new high dimensional phased arrays-based mechanism to establish highly directional transmission links between the gNodeB and the user UEs. This mechanism requires fine alignment of the transmitter and the radio equipment beams, achieved through a set of operations known as beam management. The beam management needs complex algorithms and high-level processing at gNodeBs and UEs to perform a variety of control tasks, including initial access, and beam tracking, which increase the synchronization procedure challenges.

In contrast to the known methods of determining CFO estimation, the invention relates to a method of CFO estimation for mobile communication system, especially 5G NR radio equipment in which the base phase rotation range is extended to provide an extended phase rotation range of greater than $+/-\pi$ to obtain additional CFO estimation candidates which would support a larger CFO estimation range and to get more accurate CFO estimation values.

FIG. 1 shows an exemplary embodiment of an improved radio equipment device 100 in accordance with concepts of the present invention. In the illustrated embodiment, the radio equipment device 100 may comprise a communication equipment such as a UE (denoted by the dashed line box in FIG. 1) communicatively connected to a gNodeB (base station (BS) 103) operating in a 5G NR communications system environment 115, although the improved radio equipment device 100 of the invention is not limited to operating in a NR 5G communications system but could comprise a radio equipment device for a 4G cellular network or any suitable cellular network. In another embodiment, the radio equipment device 100 may comprise a network sniffer device communicatively connected to or forming part of the gNodeB (BS) 103.

The radio equipment device 100 may comprise a plurality of functional blocks for performing various functions thereof. For example, the radio equipment device 100 includes receiver module 110 providing received signal processing and configured to provide received signals and/or information extracted therefrom to functional block module(s) 120 such as may comprise various data sink, control element(s), user interface(s), etc. Although receiver module 110 is described as providing received signal processing, it will be appreciated that this functional block may be implemented as a transceiver providing both transmitted and received signal processing. Irrespective of the particular configuration of receiver 110, embodiments include signal detection module 130 disposed in association with the receiver module 110 for facilitating accurate processing and/or decoding of received information and channel signals in accordance with the invention. Information and channel signals may be received via an antenna module 105.

Although the signal detection module 130 is shown as being deployed as part of the receiver module 110 (e.g., comprising a portion of the radio equipment module control and logic circuits), there is no limitation to such a deployment configuration according to the concepts of the invention. For example, the signal detection module 130 may be deployed as a functional block of radio equipment device 100 that is distinct from, but connected to, receiver module 110. The signal detection module 130 may, for example, be implemented using logic circuits and/or executable code/machine readable instructions stored in a memory 140 of the radio equipment device 100 for execution by a processor 150 to thereby perform functions as described herein. For example, the executable code/machine readable instructions may be stored in one or more memories 140 (e.g., random access memory (RAM), read only memory (ROM), flash memory, magnetic memory, optical memory or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 140 may comprise processor-readable memories for use with respect to one or more processors 150 operable to execute code segments of signal detection module 130 and/or utilize data provided thereby to perform functions of the signal detection module 130 as described herein. Additionally, or alternatively, the signal detection module 130 may comprise one or more special purpose processors (e.g., application specific integrated circuit (ASIC), field programmable gate array (FPGA), graphics processing unit (GPU), and/or the like configured to perform functions of the signal detection module 130 as described herein.

In one embodiment of the invention, the signal detection module 130 performs a method of CFO estimation. The signal detection module 130 performs channel estimation of a received signal on a physical channel based on OFDM symbols in one or more RSs. The signal detection module 130 determines multiple phase rotation values and corresponding time differences between different OFDM symbols in the one or more RSs over a base phase rotation range comprising +/−π to obtain a first CFO estimation candidate. The signal detection module 130 then extends the base phase rotation range to provide an extended phase rotation range of greater than +/−π to obtain additional CFO estimation candidates within the extended phase rotation range. One of the first CFO estimation candidate and additional CFO estimation candidates is used for received signal processing at the radio equipment device 100.

Whilst the radio equipment device 100 of FIG. 1 is described with respect to a UE, it could comprise any node in a mobile wireless communications system configured to implement the method of the invention.

Figure 2:
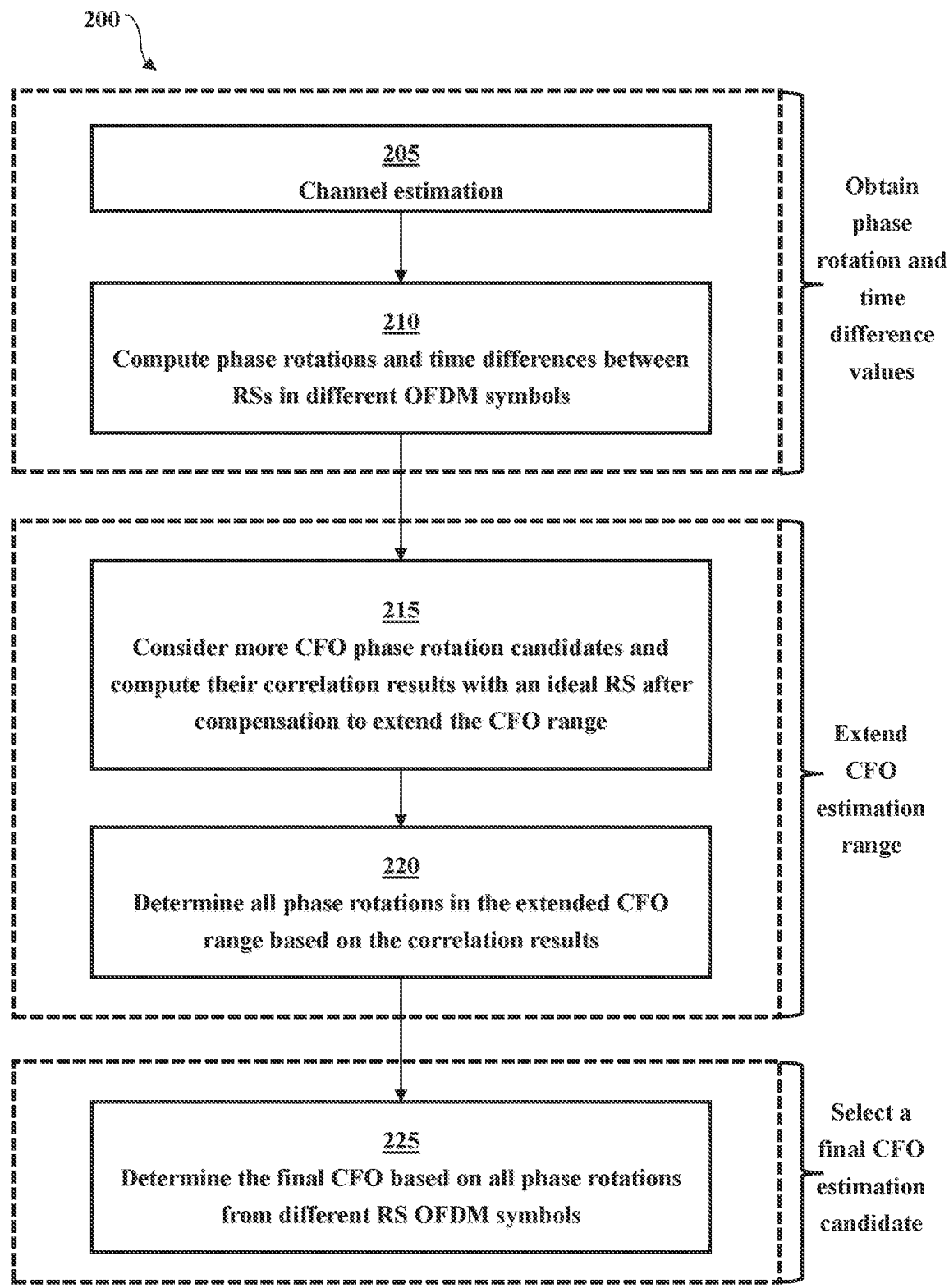
FIG. 2 is a flow diagram of a method in accordance with the invention.

FIG. 2 shows a preferred method 200 in accordance with the invention for determining CFO estimation candidates and subsequently determining a final CFO estimation candidate for received signal processing.

Referring to FIG. 2, in a first step 205 of method 200, the signal detection module 130 performs channel estimation of a received signal based on multiple OFDM symbols in one or more RSs. The RSs may comprise any one or more of: Physical Downlink Shared Channel (PDSCH) DMRS and PTRS: Physical Downlink Control Channel (PDCCH) DMRS: Physical Broadcast Channel (PBCH) DMRS: CSI-RS: Physical Uplink Shared Channel (PUSCH) DMRS and PTRS: Physical Uplink Control Channel (PUCCH) Format 1/2/3/4 DMRS; SRS; DMRS for Physical Sidelink Shared Channel (PSSCH); PTRS for PSSCH; DMRS for Physical Sidelink Control Channel (PSCCH); and DMRS for Physical Sidelink Broadcast Channel (PSBCH).

In some embodiments, the step 205 of performing channel estimation comprises a least squares method based on the multiple OFDM symbols in the one or more RSs although any other channel estimation methods may be employed. The least squares method may comprise:

$$\hat{H}_{l_n}(k) = \frac{R(k, l_n)}{P(k, l_n)} = R(k, l_n)P^*(k, l_n)$$

where k is the RS subcarrier index within resources allocated to the received signal;
$l_n$ is the symbol index for the nth RS symbol, n=0, 1, 2, 3, ... N−1;
$R(k, l_n)$ is the received signal on subcarrier k of symbol $l_n$;
$P(k, l_n)$ is an ideal RS signal on subcarrier k of symbol $l_n$ and $|P(k, l_n)|=1$; and
$P^*(k, l_n)$ is the complex conjugate of $P(k, l_n)$.

In a second step 210 of the method 200, the signal detection module 130 determines multiple phase rotation values Φ and corresponding time difference values s between different OFDM symbols in the one or more RSs over a base phase rotation range to obtain a first CFO estimation candidate $f_0$. The base phase rotation range in the OFDM system comprises +/−π.

Figure 3:
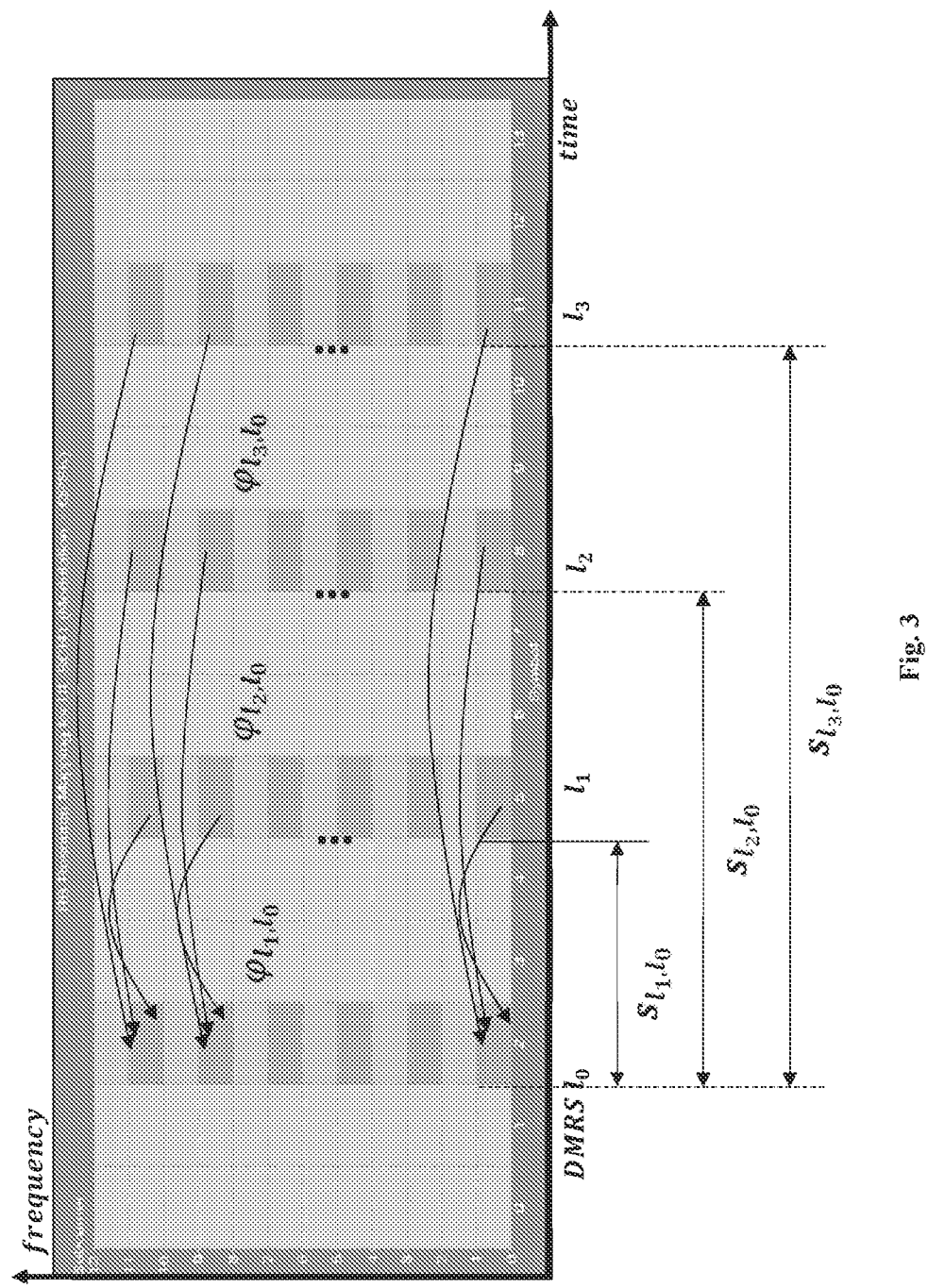
FIG. 3 shows Resource Block (RB) resource mapping for an OFDM system illustrating the limitation of the range of CFO estimation.

FIG. 3 illustrates the base phase rotation range Φ∈[−π, π] for the OFDM system where it can be seen that the CFO estimation range is inversely proportional to the time difference between 2 RSs, e.g., the maximum CFO estimation range based on $\varphi_{l_1, l_0}$ is twice that of $\varphi_{l_2, l_0}$ and three times that of $\varphi_{l_3, l_0}$. The phase rotation values denoted as $\varphi_{l_{n+\Delta}, l_n}$ are in a one-to-one correspondence with the time difference values denoted as $s_{l_{n+\Delta}, l_n}$.

Figure 4:
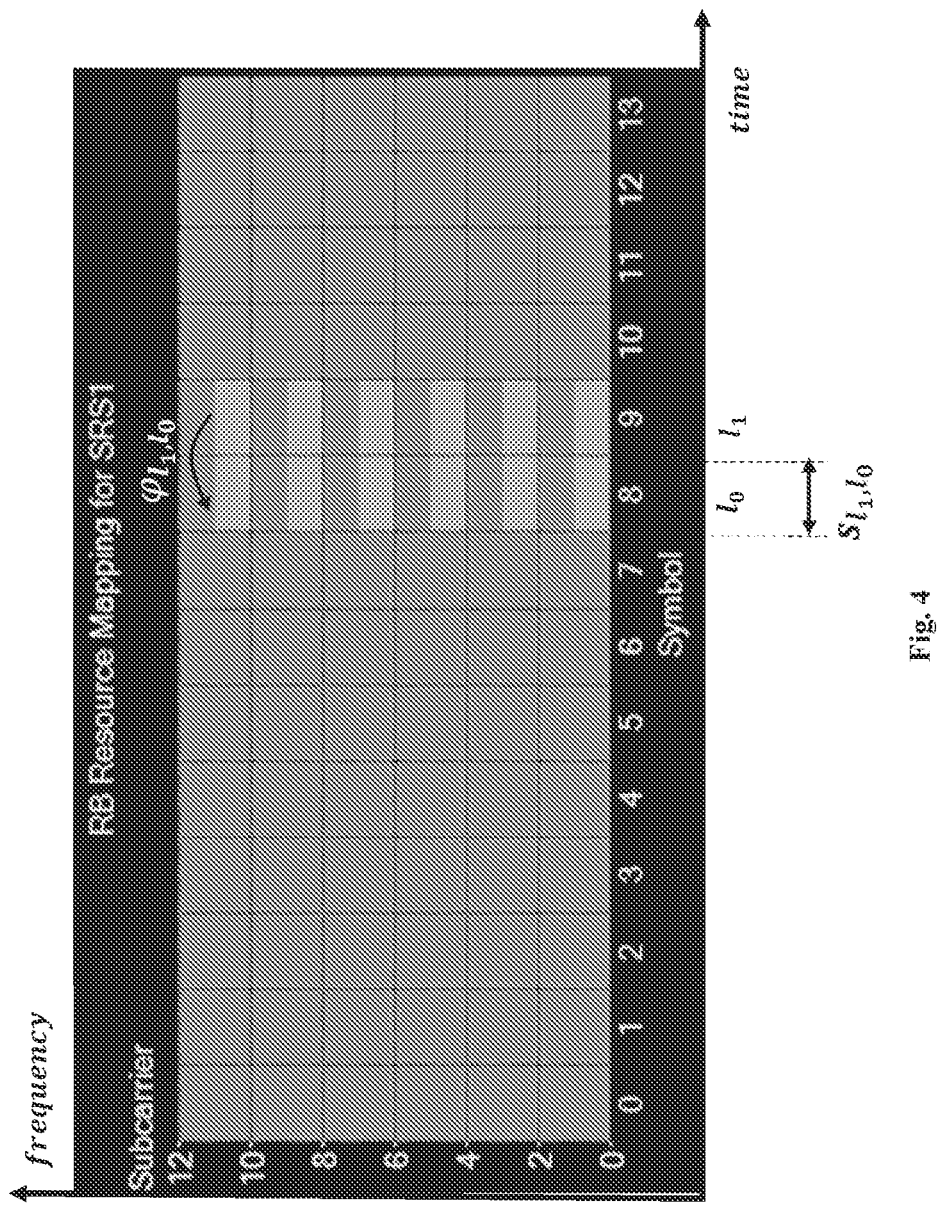
FIG. 4 shows Sounding Reference Signal (SRS) resource mapping for an OFDM system demonstrating that the method in accordance with the invention is suitable for SRS.

Referring also to FIG. 4, the thrust of the method of the invention is the channel estimation in the frequency domain from different OFDM symbols from which can be calculated the phase rotation values $\varphi_{l_{n+\Delta}, l_n}$ and the time difference values $s_{l_{n+\Delta}, l_n}$. Consequently, the method is not restricted to any specific type of RS but can use any one or any combination of RSs. In other words, the method of the invention can be implemented even where there are more than one type of RS symbols.

In some embodiments, for the step 210 of the method 200, the multiple phase rotation values $\varphi_{l_{n+\Delta}, l_n}$ and their corresponding time difference values $s_{l_{n+\Delta}, l_n}$ are determined from:

$$\varphi_{l_{n+\Delta}, l_n} = \arg\left(\sum_{k=0}^{K-1} \hat{H}_{l_{n+\Delta}}(k)\hat{H}^*_{l_n}(k)\right)$$

and $$s_{l_{n+\Delta}, l_n} = T_{l_{n+\Delta}} - T_{l_n}$$

where k is the RS subcarrier index within resources allocated to the received signal;
$l_n$ is the symbol index for the nth RS symbol, n=0, 1, 2, 3, ... N−1;
$\hat{H}_{l_n}(k)$ is the channel estimate on subcarrier k of symbol $l_n$;
$\hat{H}^*_{l_n}(k)$ is the complex conjugate of $\hat{H}_{l_n}(k)$;
$Tl_n$ is the start time of symbol $l_n$; and
arg $f(x)$ is an operation which provides the argument x from the target function $f(x)$.

One unexpected advantage of determining the multiple phase rotation values $\varphi_{l_{n+\Delta}, l_n}$ and their corresponding time difference values $s_{l_{n+\Delta}, l_n}$ in the above manner is that it improves the SNR by reducing noise.

It will be understood that any suitable method for determining the multiple phase rotation values $\varphi_{l_{n+\Delta}, l_n}$ and their corresponding time difference values $s_{l_{n+\Delta}, l_n}$ may be utilized.

Figure 5:
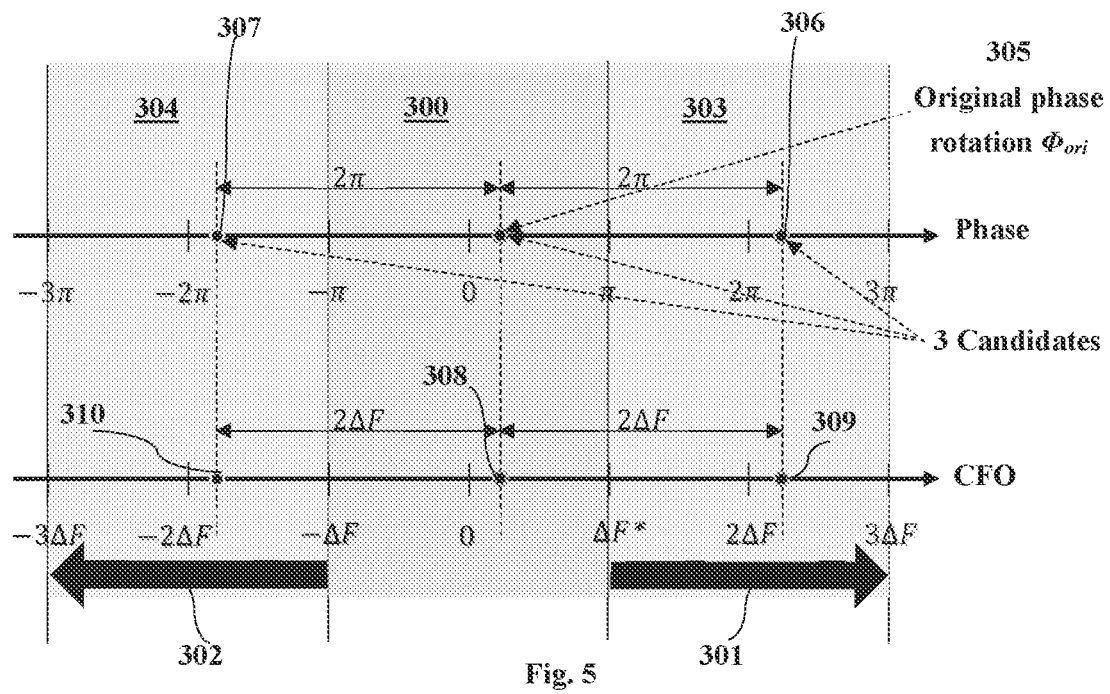
FIG. 5 illustrates an extension of the CFO estimation range in accordance with the invention.
Figure 6:
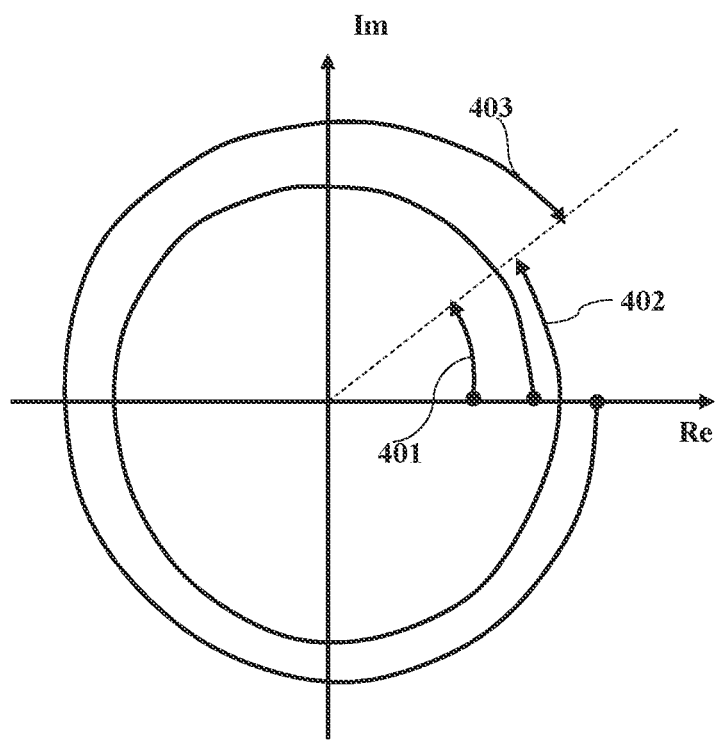
FIG. 6 illustrates possible phase rotation values in the extended CFO estimation range.

Referring now to FIGS. 5 and 6, a next stage of the method 200 of extending the CFO estimated range will be illustrated and described.

In FIG. 5, the central region 300 between the outwardly extending arrows 301, 302 comprises the base phase rotation range Φ∈[−π, π] which limits the CFO estimation range in the OFDM system. In order to estimate CFO in a larger range, the method 200 extends the phase rotation range Φ to greater than [−π, π]. In the example of FIG. 5, the phase rotation range Φ is increased to [−3π, 3π], i.e., an increase of +/−2π, providing extended phase rotation regions 303, 304 corresponding to arrows 301, 302.

Given the original phase rotation value $\Phi_{ori}$ 305, further phase rotation values $\Phi_1$, $\Phi_2$ 306, 307 are obtained respectively from the extended phase rotation regions 303, 304 with a first one $\Phi_1$ 306 of said further phase rotation values $\Phi_1$, $\Phi_2$ 306, 307 being derived from $\Phi_1=\Phi_{ori}+2\pi$ and a second one $\Phi_2$ 307 of said further phase rotation values $\Phi_1$, $\Phi_2$ 306, 307 being derived from $\Phi_2=\Phi_{ori}-2\pi$. This is illustrated in FIG. 6 where the inner arrowed line 401 comprises $\Phi_{ori}$, the middle inner arrowed line 402 comprises $\Phi_1=\Phi_{ori}+2\pi$ and the outer arrowed line 403 comprises $\Phi_2=\Phi_{ori}-2\pi$.

Referring again to FIG. 5, a first CFO estimation candidate $f_0$ 308 is determined for the original phase rotation value $\Phi_{ori}$ 305, a first additional CFO estimation candidates $f_1$ 309 is determined for the first additional phase rotation value $\Phi_1$ 306 and a second additional CFO estimation candidates $f_2$ 310 is determined for the second additional phase rotation value $\Phi_2$ 307. The first and additional phase rotation value $\Phi_{ori}$, $\Phi_1$, $\Phi_2$ correspond to $\Delta f=f_0, f_1, f_2$.

In FIG. 5, $$\Delta F = \frac{1}{2 \times \Delta T}$$

where $\Delta T$ is the time difference $s_{l_{n+\Delta}, l_n}$ between 2 RSs. For example, if the time difference between 2 DMRS symbols is 0.25 ms, then $$\Delta F = \frac{1}{2 \times 0.25 \times 10^{-3}} = 2000 \text{ Hz}$$

in this instance.

In the example of FIG. 5, the CFO estimation range has been extended by three times the normal range.

Whilst extending the base phase rotation range $\Phi \in [-\pi, \pi]$ by $+/-2\pi$ has been found to be sufficient to achieve the objectives of the invention, in a more general case, the base phase rotation range $\Phi \in [-\pi, \pi]$ may be extended by $+/-2m\pi$ to obtain additional CFO estimation candidates $f_1, f_2, f_3, f_4 \ldots f_n$ within a greater extended phase rotation range corresponding respectively to phase rotation values $\Phi_1, \Phi_2, \Phi_3, \Phi_4, \Phi_n = [\Phi_{ori} +/- 2 m\pi]$ where m is a positive integer and m is greater or equal to 1.

The next steps 215, 220 of the method 200 involves extending the CFO estimation range as described above and using the first and additional CFO estimation candidates $f_0, f_1, f_2 \ldots f_n$; to compensate a received signal, then determining cross-correlation values between an ideal RS and a received RS after the received signal has been compensated with the first and additional CFO estimation candidates $f_0, f_1, f_2 \ldots f_n$, and then determining all phase rotation values in the extended range based on the correlation results.

Figure 7:
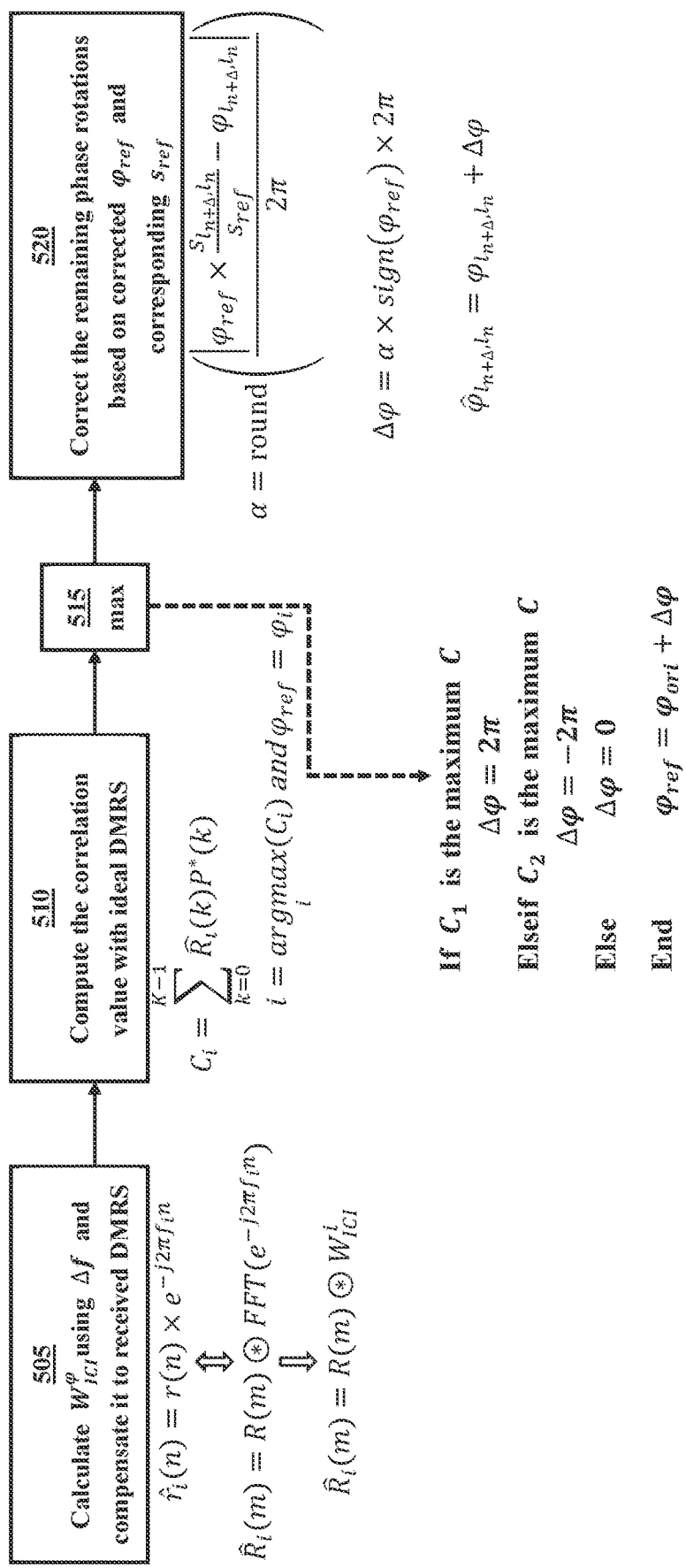
FIG. 7 illustrates stages of some of the steps of the method of FIG. 2.

Steps 215, 220 of the method 200 are more fully illustrated in FIG. 7. In the example of FIG. 7 and in the following description, the phase rotation range $\Phi$ is taken to have been extended to $[-3\pi, 3\pi]$ and reference will be made to a DMRS as the one or more RSs.

Steps 215, 220 of method 200 comprise a first stage 505 in FIG. 7 of compensating for inter-carrier interference (ICI) for the first and the two additional phase rotation values $\Phi_{ori}$, $\Phi_1, \Phi_2$ ($\Phi_{ori}$ now being denoted as $\Phi_0$) corresponding to the first and the two additional CFO estimation candidates $\Delta f = f_0, f_1, f_2$. This involves calculating $W_{ICI}^\varphi$ using $\Delta f$ and compensating it to the received DMRS.

In some embodiments, the first stage 505 is derived from:

$$\hat{r}_i(n) = r(n) \times e^{-j2\pi f_i n}$$

$$\hat{R}_i(m) = R(m) \circledast FFT(e^{-j2\pi f_i n})$$

$$\hat{R}_i(m) = R(m) \circledast W_{ICI}^i$$

where $W_{ICI}^i = FFT(e^{-j2\pi f_i n})$;
m is subcarriers index within the allocated resource;
i is the index of CFO candidates;
R is the received RS sequence in frequency domain; and
$\circledast$ is the cyclic convolution operator.

The first stage 505 may be implemented using an ICI compensation filter having few taps to perform convolution in the frequency domain to reduce ICI.

Steps 215, 220 of method 200 comprise a second stage 510 in FIG. 7 of computing cross-correlation values between an ideal DMRS sequence and a received DMRS sequence after compensation in the first stage 505. The cross-correlation values between the ideal DMRS sequence and the received DMRS sequence may be derived from:

$$C_i = \sum_{k=0}^{K-1} \hat{R}_i(k) P^*(k).$$

Steps 215, 220 of method 200 comprise a third stage 515 in FIG. 7 of selecting the CFO estimation candidate with the optimum or maximum correlation results.

In some embodiments, the third stage 515 comprises comparing the cross-correlation values after compensating the received DMRS signal with the first and additional CFO estimation candidates $f_0, f_1, f_2$ using:

$$i = \arg\max_i (C_i)$$

and $$\varphi_{ref} = \varphi_i$$

where $\hat{R}_i$ is the received RS sequence after compensation in frequency domain with $\Delta f = f_i$;
P* is the complex conjugate of ideal RS sequence in frequency domain and $|P(k)| = 1$; and $$\arg\max_x f(x)$$

maximum value from the target function $f(x)$.
Where $C_1$ is the maximum cross-correlation value then $\Delta\varphi = 2\pi$, otherwise if $C_2$ is the maximum C then $\Delta\varphi = -2\pi$, otherwise $\Delta\varphi = 0$ and $\varphi_{ref} = \varphi_{ori} + \Delta\varphi$.

Steps 215, 220 of method 200 comprise a fourth stage 520 in FIG. 7 of correcting or compensating the remaining phase rotations $\varphi_{l_{n+\Delta}, l_n}$ based on the corrected phase rotation and corresponding time differences, $\varphi_{ref}$ and $s_{ref}$.

In some embodiments, the fourth stage 520 may comprise correcting or compensating the remaining signal phase rotation values by:

$$\alpha = \text{round}\left(\frac{\left|\varphi_{ref} \times \frac{s_{l_{n+\Delta}, l_n}}{s_{ref}} - \varphi_{l_{n+\Delta}, l_n}\right|}{2\pi}\right)$$

$$\Delta\varphi = \alpha \times \text{sign}(\varphi_{ref}) \times 2\pi$$

$$\hat{\varphi}_{l_{n+\Delta}, l_n} = \varphi_{l_{n+\Delta}, l_n} + \Delta\varphi;$$

where $s_{l_{n+\Delta}, l_n}$ is the time difference corresponding to all phase rotation $\varphi_{l_{n+\Delta}, l_n}$ and
$\text{round}(A) = \lfloor A + 0.5 \rfloor$ if $A \geq 0$.

Using an ICI compensation filter having few taps to perform convolution in the frequency domain to compensate ICI caused by CFO is preferred over other methods, because the input signal to the Baseband Unit (BBU) in the eNodeB in a 5G NR communication system comprises the Resource Elements (RE)s in the frequency domain. Typically, it takes more computation effort to convert to the time domain again. An Alternative would be to use a lookup table stored in memory to obtain the $W_{ICI}{}^i$ values according to the candidate phase rotation values, and the length of $W_{ICI}{}^i$ could be smaller to reduce the computation complexity. It is also possible to use a down-sampling method to further reduce the computation complexity.

Although the method 200 obtains more than one phase rotation value, it is possible to choose only one phase rotation value to extend the CFO estimation range. Any remaining phase rotation values can be corrected accordingly without the need for convolution and correlation for every phase rotation value.

Figure 8:
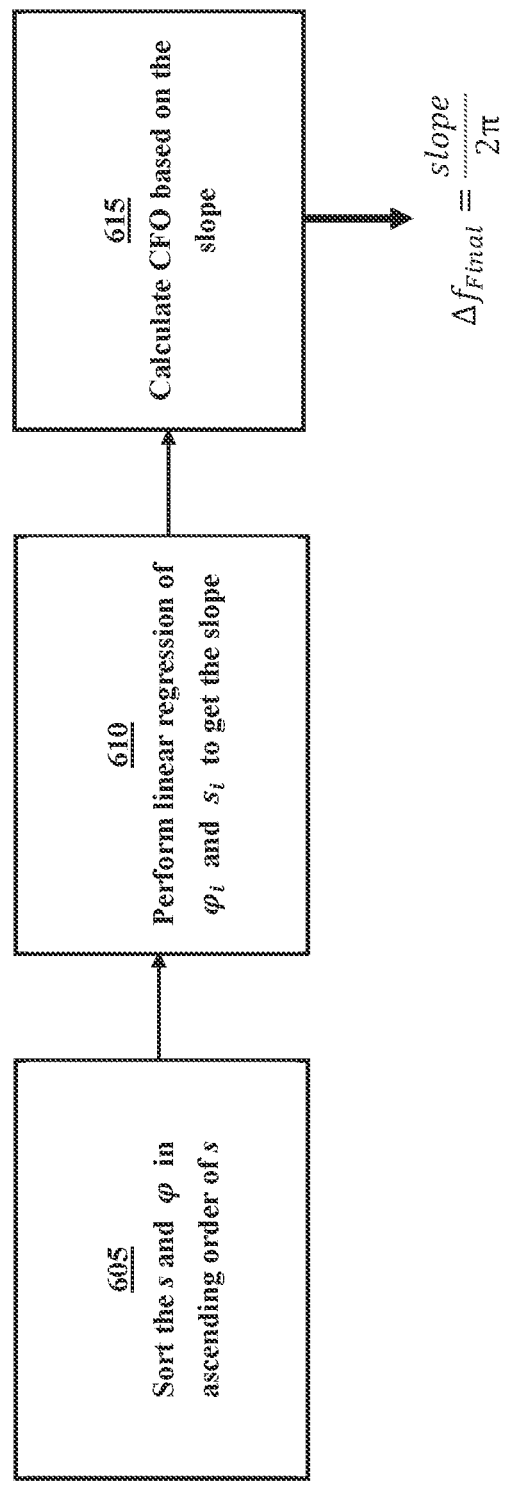
FIG. 8 illustrates stages of one of the steps of the method of FIG. 2.

The next step 225 of the method 200 involves determining a final CFO estimation candidate based on all phase rotation values from different RS OFDM symbols. Step 225 of method 200 is better illustrated by FIGS. 8 and 9 and involves computing the final CFO value based on updated phase rotation values $\hat{\varphi}_{l_{n+\Delta}, l_n}$ and corresponding time difference values $s_{l_{n+\Delta}, l_n}$.

Figure 9:
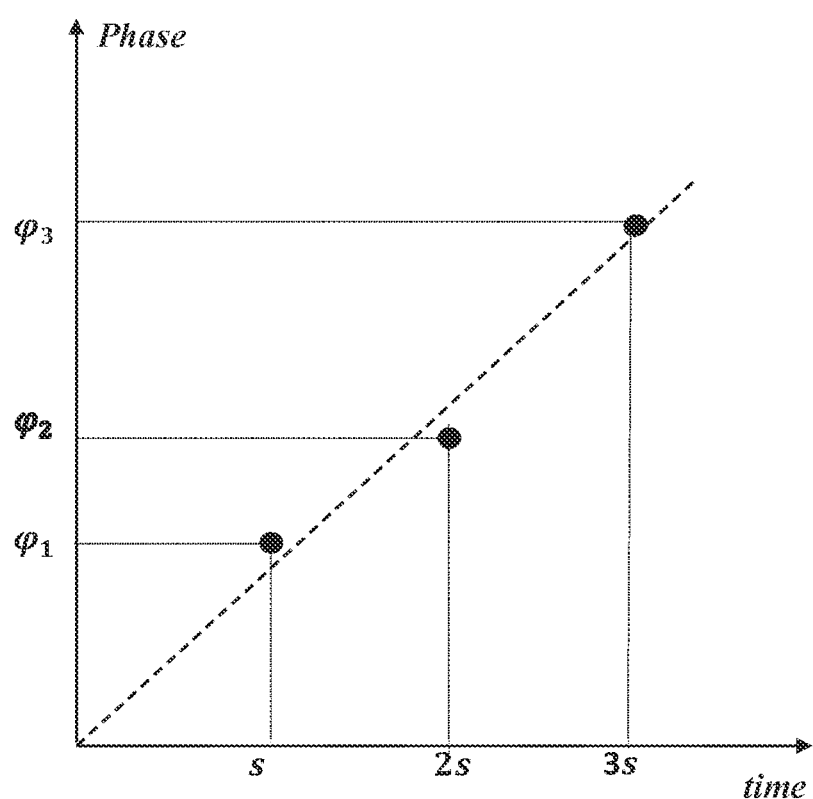
FIG. 9 diagrammatically illustrates a linear regression method forming part of the method of FIG. 2.

In some embodiments, step 225 comprises using linear regression to obtain the slope of $\varphi$ over s. This involves a first stage 605 of sorting the $s_{l_{n+\Delta}, l_n}$ in ascending order and labelling as s; and corresponding phase rotation values are labelled as $\varphi_j$ (j=1, 2, . . . , N) as illustrated in FIG. 9.

A second stage 610 comprises performing linear regression to obtain the slope of $\varphi$ over s from:

$$\text{slope} = \frac{(N+1)\sum_{j=1}^{N}(\varphi_j s_j) - \left(\sum_{j=1}^{N}\varphi_j\right)\left(\sum_{j=1}^{N}s_j\right)}{(N+1)\sum_{j=1}^{N}s_j^2 - \left(\sum_{j=1}^{N}s_j\right)^2}$$

N is typically smaller than 10 so the computation complexity is small compared to other methods and to steps such as the channel estimation step.

A third stage 615 comprises calculating the final CFO estimation candidate value from:

$$\Delta f_{final} = \frac{\text{slope}}{2\pi}.$$

It will be understood that the use of the linear regression method in step 225 is preferred, but not essential Other methods can be employed to combine all of the phase rotation values in the extended range to get the final CFO estimation candidate value from:

$$\Delta f_{Final} = \frac{\frac{1}{N}\left(\sum_{j=1}^{N}\frac{\varphi_j}{s_j}\right)}{2\pi}.$$

In some embodiments, the final CFO estimation candidate value is obtained from:

$$\Delta f_{Final} = \frac{\varphi_{ref}}{2\pi \times s_{ref}}$$

where $s_{ref}$ is the time difference corresponding to a first extended phase rotation $\varphi_{ref}$.

The method 200 uses the final CFO estimation candidate value to compensate received signals in the radio equipment device 100.

The invention also provides a method of performing carrier frequency offset (CFO) estimation of physical channels in a mobile communications system, the method comprising: performing channel estimation of a received signal on a physical channel based on multiple orthogonal frequency division multiplex (OFDM) symbols in one or more reference signals (RSS); and determining phase rotations $\Phi$ and corresponding time differences s between different OFDM symbols in the one or more RSs over an extended phase rotation range greater than +/−π to obtain multiple CFO estimation candidates $f_0$, $f_1$, $f_2$ . . . $f_n$ within the extended phase rotation range.

The invention also provides a radio equipment having a processor a memory storing machine-readable instructions, wherein, when the machine-readable instructions are executed by the processor, they configure the radio equipment to implement the method of any one of the appended method claims.

The radio equipment may comprise a UE.

The radio equipment may comprise a mobile communications system network node such as a BS or comprise part of a BS.

The invention also provides a non-transitory computer-readable medium storing machine-readable instructions, wherein, when the machine-readable instructions are executed by a processor, they configure the processor to implement the method of any one of the appended method claims.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of performing carrier frequency offset (CFO) estimation of physical channels in a mobile communications system, the method comprising:
    performing channel estimation of a received signal on a physical channel based on multiple orthogonal frequency division multiplex (OFDM) symbols in one or more reference signals (RSs);
    determining multiple phase rotation values Φ and corresponding time differences s between different OFDM symbols in the one or more RSs over a base phase rotation range comprising +/−π to obtain a first CFO estimation candidate $f_0$; and
    extending the base phase rotation range to provide an extended phase rotation range of greater than +/−π to obtain additional CFO estimation candidates $f_1, f_2 \ldots f_n$ within the extended phase rotation range;
    wherein the first CFO estimation candidate $f_0$ corresponds to a base phase rotation value $\Phi_0 = \Phi_{ori}$ where $\Phi_{ori}$ is an original phase rotation value and the additional CFO estimation candidates $f_1, f_2 \ldots f_n$ within the extended phase rotation range correspond respectively to phase rotation values $\Phi_1, \Phi_2 \ldots \Phi_n = [\Phi_{ori} +/- 2m\pi]$ where m is a positive integer.

2. The method of claim 1, wherein the extended phase rotation range comprises the original phase rotation range +/−π extended by +/−2 mπ where m is greater or equal to 1.

3. The method of claim 1, wherein the method comprises:
    compensating a received signal with the first and additional CFO estimation candidates $f_0, f_1, f_2 \ldots f_n$;
    determining cross-correlation values between an ideal RS and a received RS after the received signal has been compensated with the first and additional CFO estimation candidates $f_0, f_1, f_2 \ldots f_n$; and
    determining one of said the first and additional CFO estimation candidates $f_0, f_1, f_2 \ldots f_n$ as a final CFO estimation based on the determined cross-correlation values.

4. The method of claim 3, wherein compensating the received signal with the first and additional CFO estimation candidates $f_0, f_1, f_2 \ldots f_n$ is obtained by:

$$\hat{R}_i(m) = R(m) \circledast W_{ICI}^i$$

where $W_{ICI}^i = FFT(e^{-j2\pi f_i n})$;
m is subcarriers index within the allocated resource;
i is the index of CFO candidates;
R is the received RS sequence in frequency domain; and
⊛ is the cyclic convolution operator.

5. The method of claim 3, wherein comparing the cross-correlation values after compensating the received signal with the first and additional CFO estimation candidates $f_0, f_1, f_2 \ldots f_n$ is obtained by:

$$i = \arg\max_i(C_i) \text{ and } \varphi_{ref} = \varphi_i$$

where $C_i = \Sigma_{k=0}^{K-1} \hat{R}_i(k) P^*(k)$;
$\hat{R}_i$ is the received RS sequence after compensation in frequency domain with $\Delta f = f_i$;
$P^*$ is the complex conjugate of ideal RS sequence in frequency domain and $|P(k)|=1$; and $$\arg\max_x f(x)$$

is an operation that finds the argument x that gives the maximum value from the target function $f(x)$.

6. The method of claim 3, wherein the method uses said final CFO estimation to compensate received signals.

7. The method of claim 6, wherein the method uses said final CFO estimation to compensate the received signals by using said final CFO estimation to correct other signal phase rotations Φ.

8. The method of claim 7, wherein the final CFO estimation is obtained from:

$$\text{final } CFO \text{ estimation} = \frac{\varphi_{ref}}{2\pi \times s_{ref}}$$

where $z_{ref}$ is the time difference corresponding to a first extended phase rotation $\varphi_{ref}$.

9. The method of claim 8, wherein said final CFO estimation compensates other signal phase rotations Φ by:

$$\alpha = \text{round}\left(\frac{\left|\varphi_{ref} \times \frac{s_{l_{n+\Delta},l_n}}{s_{ref}} - \varphi_{l_{n+\Delta},l_n}\right|}{2\pi}\right)$$

$$\Delta\varphi = \alpha \times \text{sign}(\varphi_{ref}) \times 2\pi$$

$$\hat{\varphi}_{l_{n+\Delta},l_n} = \varphi_{l_{n+\Delta},l_n} + \Delta\varphi;$$

where $s_{l_{n+\alpha},l_n}$ is the time difference corresponding to all phase rotation $\varphi_{l_{n+\Delta}l_n}$; and
round(A)=⌊A+0.5⌋ if A≥0.

10. The method of claim 3, wherein the final CFO estimation is determined as comprising one of the first and additional CFO estimation candidates $f_0, f_1, f_2 \ldots f_n$ having an optimum or maximum cross-correlation value.

11. The method of claim 3, wherein the final CFO estimation based on the determined cross-correlations is determined using linear regression to obtain a slope of phase rotation Φ over time s.

12. The method of claim 11, wherein the slope is obtained by:

$$\text{slope} = \frac{(N+1)\sum_{j=1}^{N}(\varphi_j s_j) - \left(\sum_{j=1}^{N}\varphi_j\right)\left(\sum_{j=1}^{N}s_j\right)}{(N+1)\sum_{j=1}^{N}s_j^2 - \left(\sum_{j=1}^{N}s_j\right)^2}$$

where $s_j$ are the time differences corresponding to all phase rotations $\Phi_j$, j=1, 2 ... N.

13. The method of claim 12, wherein the final CFO estimation is obtained from:

$$\text{final CFO estimation} = \frac{\text{slope}}{2\pi}.$$

14. The method of claim 1, wherein the step of performing channel estimation comprises a least squares method based on the multiple OFDM symbols in the one or more RSs.

15. The method of claim 14, wherein the step of performing channel estimation using the least squares method comprises:

$$\hat{H}_{l_n}(k) = \frac{R(k, l_n)}{P(k, l_n)} = R(k, l_n)P^*(k, l_n)$$

where k is the RS subcarrier index within resources allocated to the received signal;
$l_n$ is the symbol index for the nth RS symbol, n=0, 1, 2, 3, ... N−1;
$R(k, l_n)$ is the received signal on subcarrier k of symbol $l_n$;
$P(k, l_n)$ is an ideal RS signal on subcarrier k of symbol $l_n$ and $|P(k, l_n)|=1$; and
$P^*(k, l_n)$ is the complex conjugate of $P(k, l_n)$.

16. The method of claim 2, wherein the multiple phase rotations $\Phi$ and their corresponding time differences s are determined from:

$$\varphi_{l_{n+\Delta}, l_n} = \arg\left(\sum_{k=0}^{K-1}\hat{H}_{l_{n+\Delta}}(k)\hat{H}_{l_n}^*(k)\right) \text{ and}$$

$$S_{l_{n+\Delta}, l_n} = T_{l_{n+\Delta}} - T_{l_n}$$

where k is the RS subcarrier index within resources allocated to the received signal;
$l_n$ is the symbol index for the nth RS symbol, n=0, 1, 2, 3, ... N−1;
$\hat{H}_{l_n}(k)$ is the channel estimate on subcarrier k of symbol $l_n$;
$\hat{H}_{l_n}^*(k)$ is the complex conjugate of $\hat{H}_{l_n}(K)$;
$Tl_n$ is the start time of symbol $l_n$; and
arg $f(x)$ is an operation which provides the argument x from the target function $f(x)$.

17. The method of claim 1, wherein the one or more RSs comprises any of:
Physical Downlink Shared Channel (PDSCH) Demodulation Reference Signal (DMRS) and Phase Tracking Reference Signal (PTRS);
Physical Downlink Control Channel (PDCCH) DMRS;
Physical Broadcast Channel (PBCH) DMRS;
Channel State Information Reference Signal (CSI-RS);
Physical Uplink Shared Channel (PUSCH) DMRS and PTRS;
Physical Uplink Control Channel (PUCCH) Format 1/2/3/4 DMRS;
Sounding Reference Signal (SRS);
DMRS for Physical Sidelink Shared Channel (PSSCH);
PTRS for PSSCH;
DMRS for Physical Sidelink Control Channel (PSCCH); and
DMRS for Physical Sidelink Broadcast Channel (PSBCH).

18. A method of performing carrier frequency offset (CFO) estimation of physical channels in a mobile communications system, the method comprising:
performing channel estimation of a received signal on a physical channel based on multiple orthogonal frequency division multiplex (OFDM) symbols in one or more reference signals (RSS); and
determining phase rotations $\Phi$ and corresponding time differences s between different OFDM symbols in the one or more RSs over an extended phase rotation range greater than +/−π to obtain multiple CFO estimation candidates $f_0, f_1, f_2 \ldots f_n$ within the extended phase rotation range;
wherein the first CFO estimation candidate $f_0$ corresponds to a base phase rotation value $\Phi_0=\Phi_{ori}$ where $\Phi_{ori}$ is an original phase rotation value and the additional CFO estimation candidates $f_1, f_2 \ldots f_n$ within the extended phase rotation range correspond respectively to phase rotation values $\Phi_1, \Phi_2, \ldots \Phi_n=[\Phi_{ori}+/-2 m\pi]$ where m is a positive integer.

19. A radio equipment in a mobile communications system, the radio equipment comprising:
a memory storing machine-readable instructions; and
a processor for executing the machine-readable instructions such that, when the processor executes the machine-readable instructions, it configures the radio equipment to:
perform channel estimation of a received signal on a physical channel based on multiple orthogonal frequency division multiplex (OFDM) symbols in one or more reference signals (RSs);
determine multiple phase rotations $\Phi$ and corresponding time differences s between different OFDM symbols in the one or more RSs over a base phase rotation range comprising +/−π to obtain a first CFO estimation candidate $f_0$; and
extend the base phase rotation range to provide an extended phase rotation range of greater than +/−π to obtain additional CFO estimation candidates $f_1, f_2 \ldots f_n$ within the extended phase rotation range;
wherein the first CFO estimation candidate $f_0$ corresponds to a base phase rotation value $\Phi_0=\Phi_{ori}$ where $\Phi_{ori}$ is an original phase rotation value and the additional CFO estimation candidates $f_1, f_2 \ldots f_n$ within the extended phase rotation range correspond respectively to phase rotation values $\Phi_1, \Phi_2, \ldots \Phi_n=[\Phi_{ori}+/-2m\pi]$ where m is a positive integer.

* * * * *